United States Patent [19]

Hatch

[11] Patent Number: 5,326,111
[45] Date of Patent: Jul. 5, 1994

[54] SEPARATELY BONDED ELASTOMERIC SLEEVE FOR SEAL CASING

[75] Inventor: Frederick R. Hatch, Ann Arbor, Mich.

[73] Assignee: Mather Seal Company, Milan, Mich.

[21] Appl. No.: 956,816

[22] Filed: Oct. 5, 1992

Related U.S. Application Data

[63] Continuation of Ser. No. 732,863, Jul. 19, 1991, abandoned.

[51] Int. Cl.$^5$ .............................................. F16J 15/32
[52] U.S. Cl. ...................................................... 277/37
[58] Field of Search ................ 277/1, 37, 35, 152, 277/153, 182; 156/165, 196, 293; 220/614; 215/349, 352

[56] References Cited

U.S. PATENT DOCUMENTS

| | | | |
|---|---|---|---|
| 255,005 | 3/1882 | Murphin | 215/352 |
| 734,140 | 7/1903 | Schram | 215/352 X |
| 800,891 | 10/1905 | Adlam | 215/352 |
| 933,122 | 9/1909 | Schram | 215/352 X |
| 2,474,123 | 6/1949 | Schmitz | 277/37 |
| 2,493,255 | 1/1950 | Lillis | 156/293 X |
| 2,692,786 | 10/1954 | Reynolds | 277/35 |
| 3,184,357 | 5/1965 | Kaspar | 156/165 |
| 3,362,719 | 1/1968 | McCormick | 277/153 |
| 3,462,333 | 8/1969 | McCormick et al. | 277/182 |
| 3,536,333 | 10/1970 | Gits et al. | 277/37 |
| 3,682,488 | 8/1972 | Matsushima | 277/37 |
| 3,843,139 | 10/1974 | Messenger | 277/37 |
| 4,125,266 | 11/1978 | Schonherr et al. | 277/153 |
| 4,327,922 | 5/1982 | Walther | 277/37 |
| 4,552,367 | 11/1985 | Fedorovich et al. | 277/37 X |
| 4,621,964 | 11/1986 | Radtke et al. | 220/614 X |
| 4,995,621 | 2/1991 | Devouassoux et al. | 277/37 |
| 5,004,248 | 4/1991 | Messenger et al. | 277/37 |
| 5,024,450 | 6/1991 | Hawley et al. | 277/37 |

FOREIGN PATENT DOCUMENTS

| | | | |
|---|---|---|---|
| 612078 | 5/1952 | Fed. Rep. of Germany | 277/37 |
| 3608954 | 9/1987 | Fed. Rep. of Germany | 277/152 |
| 0962097 | 6/1964 | United Kingdom . | |

*Primary Examiner*—William A. Cuchlinski, Jr.
*Assistant Examiner*—John L. Beres
*Attorney, Agent, or Firm*—Lawrence J. Shurupoff

[57] ABSTRACT

A shaft seal includes an annular rigid seal case insertable into a cylindrical bore in a seal housing. The joint between the seal case and the bore is sealed by an annular resilient sleeve stretched over the outer surface of the case. The sleeve is initially formed as a thin flat annular elastomeric disk by a low cost molding or slicing operation. Installation of the sealing element on the seal case is accomplished by stretching the disk radially and then turning it angularly from a radial disk orientation to an axial sleeve configuration.

8 Claims, 1 Drawing Sheet

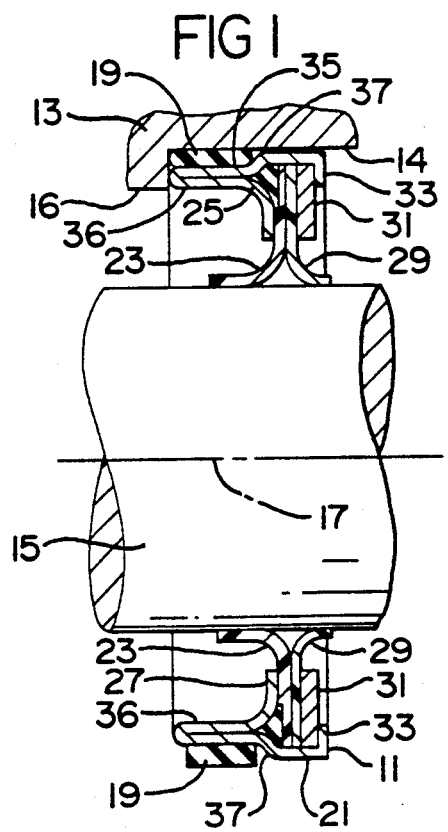
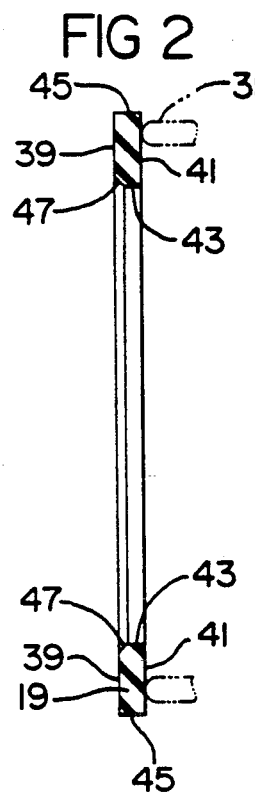
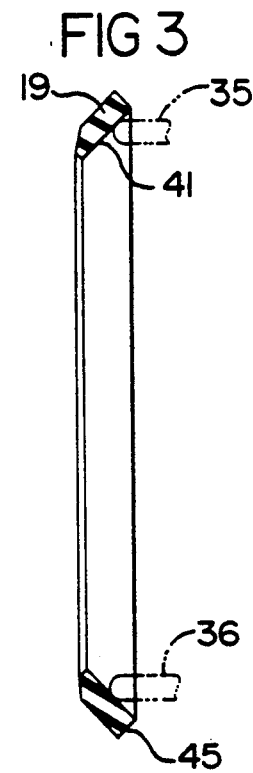
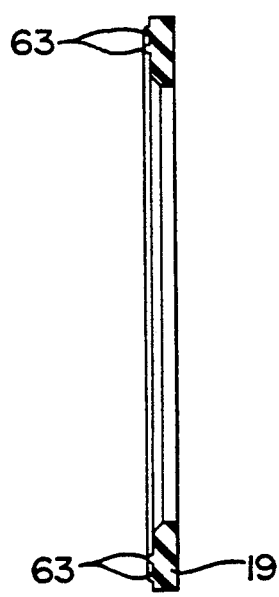
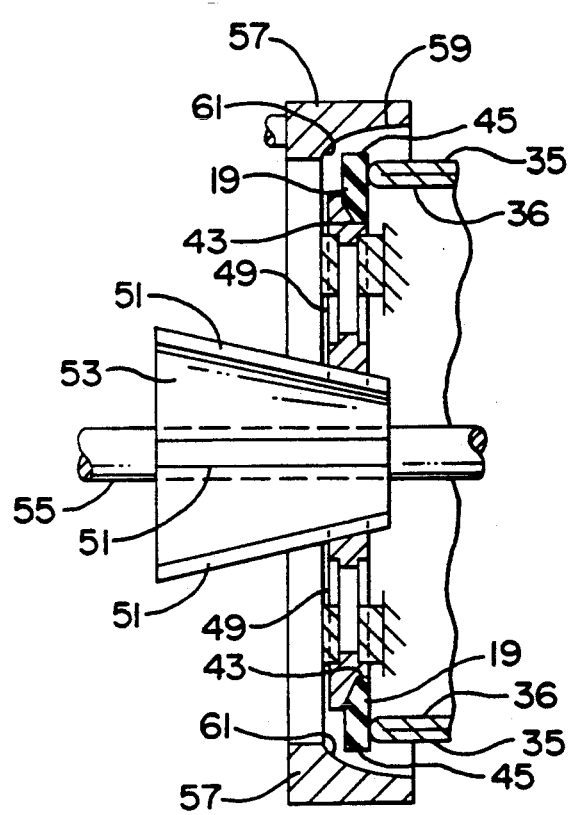

SEPARATELY BONDED ELASTOMERIC SLEEVE FOR SEAL CASING

This is a continuation of co-pending U.S. patent application Ser. No. 07/732,863 filed on Jul. 19, 1991 now abandoned.

BACKGROUND OF THE INVENTION

1. Field of the Invention

This invention relates to rotary shaft seals, and particularly to seal assemblies adapted to be installed in cylindrical bores concentric with the axis of the rotary shaft.

2. Description of Prior Developments

Polytetrafluoroethylene has been used to form the sealing lip in rotary shaft seals because of its resistance to elevated operating temperatures, resistance to chemical attack, and resistance to wear. An example of a shaft seal assembly using polytetrafluoroethylene as a shaft seal lip element is shown in U.S. Pat. No. 3,462,333 to McCormick, et al.

In many cases the polytetrafluoroethylene seal element is mounted within an annular metallic seal case that has an outer annular surface adapted to fit into a cylindrical bore in a housing wall that serves as a mount for an anti-friction shaft bearing. It is necessary that the annular peripheral joint between the metal seal case and cylindrical bore be adequately sealed against liquid flow. In the past, this seal between the seal casing and bore has sometimes been formed by molding or coating an annular layer of rubber or elastomer onto the outer surface of the seal case as shown for example in U.S. Pat. No. 3,682,488 to Matsushima.

In many cases, heat is required to subsequently mold or bond the outer annular elastomeric seal to the metallic case. Such heat can have an adverse effect on the polytetrafluoroethylene shaft seal element, particularly as regards its dimensional stability, resilience and wear characteristics.

Because polytetrafluoroethylene must be heated to its gel temperature of about 621° F. to bond the PTFE to the seal case, any layer of elastomer applied to the metal seal case must be applied after the polytetrafluoroethylene-to-metal bond has been completed. Otherwise, the elastomer will be degraded or rendered inoperative by the high temperatures required for polytetrafluoroethylene bonding. Thus, the elastomeric seal material must be applied to the seal case after the PTFE bonding operation.

Accordingly, a need exists for a shaft seal having a PTFE sealing element bonded to a metal seal casing and which includes an elastomeric sleeve bonded around the outer surface of the seal case without adversely affecting either the PTFE sealing element or the elastomeric sleeve.

SUMMARY OF THE INVENTION

The present invention is directed to a shaft seal that includes an annular metallic seal case having an annular outer surface adapted to be mounted within a cylindrical bore in a seal housing. A resilient annular outer seal element is carried on the outer surface of the seal case to seal the joint between the seal case and housing bore.

The outer elastomeric seal element is secured to the seal case after a primary PTFE sealing lip is bonded to the seal case in order to protect the elastomeric material from the high temperatures required for bonding the PTFE sealing lip to the seal case. The outer elastomeric seal element is not formed by molding elastomer to the seal case, but rather by preforming the seal element by machining or stamping and bonding it at room temperature to the seal case. The outer seal element can be a low cost radial annular disk formed out of a relatively inexpensive elastomer or rubber.

The elastomeric sealing disk is installed on the outer annular surface of the seal case by stretching the elastomeric disk radially outwardly, and then turning the disk from a radial configuration to form a cylindrical or tubular sealing element configuration. The elastomeric tubular sealing element is then radially expanded or stretched and moved axially onto the seal case. Due to the radial stretching of the elastomeric material, the elastomer is in a permanently stressed condition in engagement with the outer surface of the seal case.

The radial disk may be initially formed in a molding operation, e.g. in a mold cavity having a thin flat annular configuration. A multiple cavity mold system can be used. Alternatively, the disk may be formed by slicing thin radial sections from an elongated annular tube with each slice constituting one radial disk. Still another way to form the disk is to stamp or blank it from a sheet of elastomeric material. In any case, the radial disk formation process is a relatively inexpensive operation.

The use of a radial disk to form a peripheral seal on a metal seal casing is a relatively simple process compared to molding. By way of contrast, molding a sleeve of elastomeric material onto and around the outer surface of a seal case is not easily accomplished, especially if it is desired to achieve a thin and closely controlled elastomer wall thickness and/or a smooth elastomer finish. That is, the stretched dimensions and finish of an elastomeric sealing element formed according to the present invention may be easily controlled.

BRIEF DESCRIPTION OF THE DRAWINGS

FIG. 1 is a sectional view taken through a shaft seal assembly embodying the invention.

FIG. 2 is a sectional view through a radial elastomeric disk for use in the FIG. 1 assembly.

FIG. 3 is a view taken in the same direction as FIG. 2, but showing the disk in a transitional state during the process of installing the disk onto an annular seal case.

FIG. 4 is a sectional view taken in the same direction as FIG. 2, but showing an alternative disk configuration that can be employed in practicing the invention.

FIG. 5 is a diagrammatic illustration of an apparatus that can be used to install the FIG. 2 elastomeric disk onto the seal case shown in FIG. 1.

DETAILED DESCRIPTION OF THE PREFERRED EMBODIMENTS

FIG. 1 shows a radial lip shaft seal assembly 11 installed in an annular clearance space between a stationary housing 13 and a rotary shaft 15. Seal assembly 11 is mounted in bore 14 of the housing 13. The shaft may be supported in bearings for rotation around shaft axis 17.

The shaft seal assembly can be used as an oil seal, in which case the zone to the left of the shaft seal assembly will typically have an anti-friction bearing fitted therein. The outer race of the bearing will be mounted in a bore 16 in housing 13 while the inner race of the bearing will be mounted on shaft 15.

Housing 13 is shown fragmentarily in FIG. 1 to better illustrate two configurations of the annular elastomeric seal element 19, i.e. prior to installation of the seal assembly into housing 13, and after installation of the seal assembly into the housing. The upper portion of FIG. 1 shows seal element 19 after insertion of the shaft seal assembly into housing 13, whereas the lower portion of FIG. 1 shows seal element 19 in an uncompressed condition prior to insertion of the shaft seal assembly into housing 13.

Seal case 21 is a rigid metallic annular structure having a radial flange 27 in facial engagement with one face of a shaft seal lip or seal element 23. The shaft-engaged seal lip 23 may be varied in its configuration and material. However, in a preferred embodiment of the invention annular seal lip 23 is formed of a wafer of flexible resilient polytetrafluoroethylene resin.

An auxiliary dust seal lip or seal element 29 is facially engaged with the right face of seal lip 23. The two radial seal lips 23 and 29 are clamped together between flange 27 and an annular flat plate or washer 31 and an inturned flange 33 on case member 25.

The seal case 21 includes an annular outer wall 36 having an outer cylindrical annular surface 35, and an annular shoulder 37 projecting radially outwardly from surface 35 to limit rightward insertional motion of seal element 19 onto the case and to axially position the seal element thereon during the initial manufacture of the shaft seal assembly prior to installation of the assembly into housing 13.

FIG. 2 shows elastomeric seal element 19 in its as-formed state, prior to insertion of the element onto case 21. Element 19 is an elastomeric or rubber annular disk having two radial faces 39 and 41, an inner peripheral edge 43 and an outer peripheral edge 45. The annular cross-sectional corner between disk face 39 and inner peripheral edge 43 is chamfered, as at 47, for the purpose of facilitating the insertion of the manufactured seal assembly 11 into housing bore 14. The seal assembly is moved axially in a right-to-left direction (FIG. 1) to insert the assembly into housing 13.

Elastomeric disk 19 (FIG. 1) is installed on the case outer annular surface 35 by stretching the disk radially, and turning it 90° rightwardly into a sleeve configuration. FIG. 3 illustrates the elastomeric element in a transitional state after having been stretched radially and partially turned for rightward motion onto the annular case wall 36. The elastomeric disk is formed so that its major diameter, measured across its outer edge 45, is approximately the same as the diameter measured across case surface 35 so that the peripheral edge 43 is stretched radially more than the outer peripheral edge 45.

The radial disk 19 is relatively thin in the axial direction so that it can be stretched radially. Such radial stretching of the elastomeric disk brings edge 45 outwardly beyond case surface 35 where the annular disk can be turned for axial motion onto and over case surface 35. FIG. 1 shows the final position of the seal element 19 relative to annular case 21. The seal element is in a stretched condition, such that it tightly grips case surface 35 for firm retention of the seal element on the case. Adhesives may be applied to face 41 and/or surface 35 for bonding and retention of the seal element 19 on the case.

The process of installing seal element 19 on case 21 can usually be performed by hand-stretching and manual manipulation of the elastomeric element. Alternatively, tooling can be developed to perform the installation operation. FIG. 5 shows one tooling set-up that could be used. The elastomeric disk 19 is placed on a holder which includes four or more segmental sections 49 having outer arcuate edges conforming to the configuration of inner edge 43 of the disk 19.

Each segmental section 49 has an inner edge formed with a dovetail slot that mates with a key 51 projecting from the outer surface of a frusto-conical spreader member 53. Member 53 can be slidably mounted on a stationary guide shaft 55. Movement of member 53 to the right in FIG. 5 causes segmental holder sections 49 to move radially outwardly so that edges 45 of elastomeric disk 19 move against annular guide surface 59 on deflection member 57.

As disk 19 is spread further away from central axis 17, the guide surface 59 turns the elastomeric and flexible disk from a radial configuration into an axial sleeve configuration. The elastomeric element is thus telescoped onto case surface 35. However, the elastomeric element is not at this time fully telescoped onto case wall 36.

The elastomeric element can be moved to the FIG. 1 position on wall 36 by moving member 57 in a left-to-right direction. Internal surface 61 in member 57 exerts an axial pushing force on edge 43 of the elastomeric element. By controlling the axial stroke of member 57 it is possible to move seal element 19 to its final installed position on the case.

The apparatus shown in FIG. 5 is merely illustrative of one of various mechanical devices that could be used to insert annular peripheral seal element 19 onto seal case 21. The invention is concerned more particularly with the disk element configuration and method for installing the disk element on the case.

As shown in FIG. 1, the entire outer surface 39 of the elastomeric element 19 is in sealing contact with bore surface 14. However, it is possible to have approximate line contact of the sealing element on bore surface 14 while still achieving an effective sealing action. FIG. 4 shows a modified sealing disk structure, wherein two annular sealing ribs 63 project from face 39 of the disk. Ribs 63 may be formed by machining or by molding.

When the FIG. 4 disk construction is used, the sealing ribs will be compressed by engagement with the surface of bore 14 thereby sealing the peripheral joint at the case-bore interface. The main body portion of the elastomeric element can be in an essentially uncompressed condition and the metallic case will be mated to bore 14 so that the major diameter of the case to the right of shoulder 37 has a press-fit against the surface of bore 14.

The drawings show illustrative configurations and arrangements. The invention can be practiced in various forms and configurations.

What is claimed is:

1. A radial lip rotary shaft seal comprising:
   a rigid annular seal case having a radial flange and an outer surface portion insertable into a bore that surrounds a shaft;
   a first radial lip sealing element comprising polytetrafluoroethylene and supported by the radial flange for sealing between the case and the shaft;
   a second sealing element extending axially along said outer surface of said case for sealing between the case and the bore;
   said second sealing element comprising a preformed elastomeric disk having two radial faces, an inner peripheral edge, and an outer peripheral edge, said inner peripheral edge of said disk comprising a radially stretched portion surrounding said outer surface of said case;

said outer peripheral edge of said disk being radially stretched less than said inner peripheral edge and one of the radial faces engaging said outer surface via permanently stressed facial contact and bonded thereto with an adhesive, and the other radial face comprising a bore contacting sealing surface.

2. The shaft seal of claim 1, and further comprising at least one annular sealing rib projecting from said other radial face of the disk.

3. The shaft seal assembly of claim 1, wherein said disk is chamfered to facilitate entry of the shaft seal into the bore.

4. The shaft seal of claim 1, further comprising an annular shoulder projecting radially outwardly from said outer surface of said case to prevent axial displacement of the second sealing element along said outer surface.

5. A method of assembling an annular resilient elastomeric sealing surface on an annular outer surface of a rotary shaft seal case which comprises metal and which is insertable into a bore that surrounds a shaft, said method comprising the steps of:

mounting a radial lip sealing element comprising polytetrafluoroethylene to the case;

performing an annular resilient elastomeric sealing disk comprising two radial faces, an inner peripheral edge, and an outer peripheral edge;

mounting the preformed disk to the case, after mounting the sealing element to the case, by stretching and turning the disk so that said inner peripheral edge is stretched more than said outer peripheral edge, and so that one of the radial faces is in permanently stressed facial contact with the outer surface of the case and the other radial face comprises a bore contacting sealing surface;

applying an adhesive between the preformed disk and the case; and bonding the preformed disk to the case with said adhesive.

6. The method of claim 5, further comprising the step of moving said disk axially along the case outer surface to provide a biased frictional fit between said one disk face and said outer surface of the case.

7. A radial lip shaft seal comprising:

a rigid annular seal case having a radial flange and an outer surface portion insertable into a bore that surrounds a shaft;

a first radial lip sealing element comprising polytetrafluoroethylene mounted to the case and supported by the radial flange for sealing between the case and the shaft;

a second sealing element extending axially along said outer surface for sealing between the case and the bore;

said second sealing element being preformed by slicing a thin radial section from an annular tube to provide an elastomeric disk having two machined radial faces, an inner peripheral edge, and an outer peripheral edge; and said elastomeric disk being bonded to said outer surface of said case with an adhesive after said first sealing element is mounted to said case, said elastomeric disk being stretched and turned so that one of the radial faces is bonded in facial contact with said outer surface, and the other radial face is oriented to have sealing contact against the bore.

8. A radial lip rotary shaft seal comprising:

a rigid annular seal case having a radial flange and an outer surface portion insertable into a bore that surrounds a shaft;

a first radial lip sealing element mounted to the case and supported by the radial flange for sealing between the case and the shaft;

a second sealing element extending axially along said outer surface of said case for sealing between the case and the bore;

said second sealing element comprising an elastomeric disk having two opposed radial faces, an inner peripheral edge, and an outer peripheral edge;

an adhesive bond bonding said elastomeric disk to said outer surface of said case;

said elastomeric disk comprising a stretched and turned radial disk defining an axial sleeve having one of said radial faces bonded in facial contact with said outer surface by said bond, and having the other radial face comprising a bore contacting sealing surface; and said inner peripheral edge of said disk comprising a radially stretched peripheral edge which is stretched more than said outer peripheral edge of said disk.

* * * * *

UNITED STATES PATENT AND TRADEMARK OFFICE
CERTIFICATE OF CORRECTION

PATENT NO. : 5,326,111

DATED : July 5, 1994

INVENTOR(S) : Frederick R. Hatch

It is certified that error appears in the above-identified patent and that said Letters Patent is hereby corrected as shown below:

Column 5, line 28, claim 5, "performing" should read --preforming--

Signed and Sealed this

Thirteenth Day of September, 1994

Attest:

BRUCE LEHMAN

Attesting Officer

Commissioner of Patents and Trademarks